(12) United States Patent
Sundaresan et al.

(10) Patent No.: US 10,956,284 B2
(45) Date of Patent: Mar. 23, 2021

(54) USING HARDWARE TRANSACTIONAL MEMORY TO OPTIMIZE REFERENCE COUNTING

(71) Applicant: INTERNATIONAL BUSINESS MACHINES CORPORATION, Armonk, NY (US)

(72) Inventors: Vijay Sundaresan, North York (CA); Andrew J. Craik, North York (CA); Younes Manton, Toronto (CA); Yi Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 16/240,926

(22) Filed: Jan. 7, 2019

(65) Prior Publication Data
US 2020/0218620 A1 Jul. 9, 2020

(51) Int. Cl.
*G06F 11/14* (2006.01)
*G06F 12/02* (2006.01)
(Continued)

(52) U.S. Cl.
CPC ............ *G06F 11/1474* (2013.01); *G06F 8/41* (2013.01); *G06F 9/4552* (2013.01); *G06F 9/467* (2013.01);
(Continued)

(58) Field of Classification Search
CPC .... G06F 11/1474; G06F 8/41; G06F 12/0261; G06F 2201/82; G06F 2212/1044; G06F 9/4552; G06F 9/467
See application file for complete search history.

(56) References Cited

U.S. PATENT DOCUMENTS

| 6,260,117 B1* | 7/2001 | Freerksen | G06F 12/0811 |
| | | | 711/118 |
| 6,993,770 B1* | 1/2006 | Detlefs | G06F 9/526 |
| | | | 707/999.103 |

(Continued)

OTHER PUBLICATIONS

Automatic reference counting; https://developer.apple.com/library/content/documentation/Swift/Conceptual/Swift_Programming_Language/AutomaticReferenceCounting.html; retrieved from the Internet Feb. 27, 2017; 14 pages.
(Continued)

*Primary Examiner* — Gabriel Chu
*Assistant Examiner* — Matthew N Putaraksa
(74) *Attorney, Agent, or Firm* — Schmeiser, Olsen & Watts; Michael P. O'Keefe

(57) ABSTRACT

An approach is provided for optimizing reference counting. Responsive to receiving code representing a program by a just-in-time compiler, one or more processors in computing machinery supporting transactional memory identify regions of the code having respective sets of reference counting operations executed dynamically. Identifying the regions of the code uses an analysis of semantics of the code. The identified regions are enclosed in respective transactions. The code that was to perform atomic operations, including the reference counting operations in the identified regions, is transformed into new code that performs non-atomic operations that are variants of the atomic operations. Fallback code sequences are inserted into the transformed code. In a non-transactional manner and in response to detections of failures in respective transactions, the fallback code sequences execute original code sequences that were in the code prior to the transformation of the code. The original code sequences include respective multiple atomic operations.

20 Claims, 4 Drawing Sheets

(51) Int. Cl.
*G06F 8/41* (2018.01)
*G06F 9/455* (2018.01)
*G06F 9/46* (2006.01)

(52) U.S. Cl.
CPC ...... *G06F 12/0261* (2013.01); *G06F 2201/82* (2013.01); *G06F 2212/1044* (2013.01)

(56) References Cited

U.S. PATENT DOCUMENTS

| | | | |
|---|---|---|---|
| 7,552,428 B2* | 6/2009 | Stoodley | G06F 9/45516 717/140 |
| 8,229,979 B2 | 7/2012 | Manolov et al. | |
| 8,533,699 B2 | 9/2013 | Moir | |
| 9,383,979 B2 | 7/2016 | Adl-Tabatabai | |
| 9,513,812 B2* | 12/2016 | Edwards | G06F 12/0253 |
| 9,552,382 B2 | 1/2017 | Barrus | |
| 2009/0094301 A1* | 4/2009 | Joisha | G06F 12/0261 |
| 2012/0254846 A1* | 10/2012 | Moir | G06F 9/30087 717/152 |
| 2014/0101178 A1* | 4/2014 | Ginter | G06F 16/90335 707/755 |
| 2014/0317352 A1 | 10/2014 | Kleen | |
| 2016/0179586 A1* | 6/2016 | Wang | G06F 9/3834 711/125 |
| 2016/0378476 A1* | 12/2016 | Bradbury | G06F 9/3834 712/225 |
| 2018/0239597 A1* | 8/2018 | Kawachiya | G06F 9/4488 |
| 2018/0260255 A1 | 9/2018 | Yazdani et al. | |

OTHER PUBLICATIONS

Hergert, Christian; Reference Counting; Apr. 23, 2014; http://www.hergert.me/blog/2014/04/23/ref-counting.html; 2 pages.
WIKIPEDIA; Load-link/store-conditional; https://en.wikipedia.org/wiki/Load-link/store-conditional; last updated Aug. 15, 2018; 4 pages.

* cited by examiner

USING HARDWARE TRANSACTIONAL MEMORY TO OPTIMIZE REFERENCE COUNTING

BACKGROUND

The present invention relates to computer resource management, and more particularly to reference counting optimization.

Known programming languages that lack mark and sweep garbage collectors use reference counting to track uses and lifetimes of computer resources, which include objects, blocks of memory, and disk space (i.e., by storing the number of references, pointers, or handles to each resource). Reference counting is a memory management technique to recycle memory and keep the memory footprint low because object memory is reclaimed as soon as there are no remaining references to the object or other resource.

SUMMARY

In one embodiment, the present invention provides a computer-implemented method of optimizing reference counting. The method includes in response to receiving code representing a program by a just-in-time (JIT) compiler, identifying, by one or more processors in computing machinery supporting transactional memory, regions of the code having respective pluralities of reference counting operations executed dynamically. Identifying the regions of the code includes using an analysis of semantics of the code. The method further includes enclosing, by the one or more processors and using the transactional memory, the identified regions in respective transactions. The method further includes transforming, by the one or more processors and within the transactions, the code that was to perform atomic operations, including the reference counting operations in the identified regions, into new code that performs non-atomic operations that are variants of the atomic operations. The method further includes inserting, by the one or more processors and into the transformed code, fallback code sequences that execute, in a non-transactional manner and in response to detections of failures in respective transactions, original code sequences that were in the code prior to the step of transforming, including respective multiple atomic operations.

In another embodiment, the present invention provides a computer program product for optimizing reference counting. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes in response to receiving code representing a program by a just-in-time (JIT) compiler, the computer system identifying regions of the code having respective pluralities of reference counting operations executed dynamically. Identifying the regions of the code includes using an analysis of semantics of the code. The computer system is included in computing machinery that supports transactional memory. The method further includes the computer system enclosing the identified regions in respective transactions by using the transactional memory. The method further includes the computer system transforming the code within the transactions that was to perform atomic operations, including the reference counting operations in the identified regions, into new code that performs non-atomic operations that are variants of the atomic operations. The method further includes the computer system inserting into the transformed code fallback code sequences that execute, in a non-transactional manner and in response to detections of failures in respective transactions, original code sequences that were in the code prior to the step of transforming, including respective multiple atomic operations.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of optimizing reference counting. The method includes in response to receiving code representing a program by a just-in-time (JIT) compiler, the computer system identifying regions of the code having respective pluralities of reference counting operations executed dynamically. Identifying the regions of the code includes using an analysis of semantics of the code. The computer system is included in computing machinery that supports transactional memory. The method further includes the computer system enclosing the identified regions in respective transactions by using the transactional memory. The method further includes the computer system transforming the code within the transactions that was to perform atomic operations, including the reference counting operations in the identified regions, into new code that performs non-atomic operations that are variants of the atomic operations. The method further includes the computer system inserting into the transformed code fallback code sequences that execute, in a non-transactional manner and in response to detections of failures in respective transactions, original code sequences that were in the code prior to the step of transforming, including respective multiple atomic operations.

DETAILED DESCRIPTION

Overview

Figure 1:
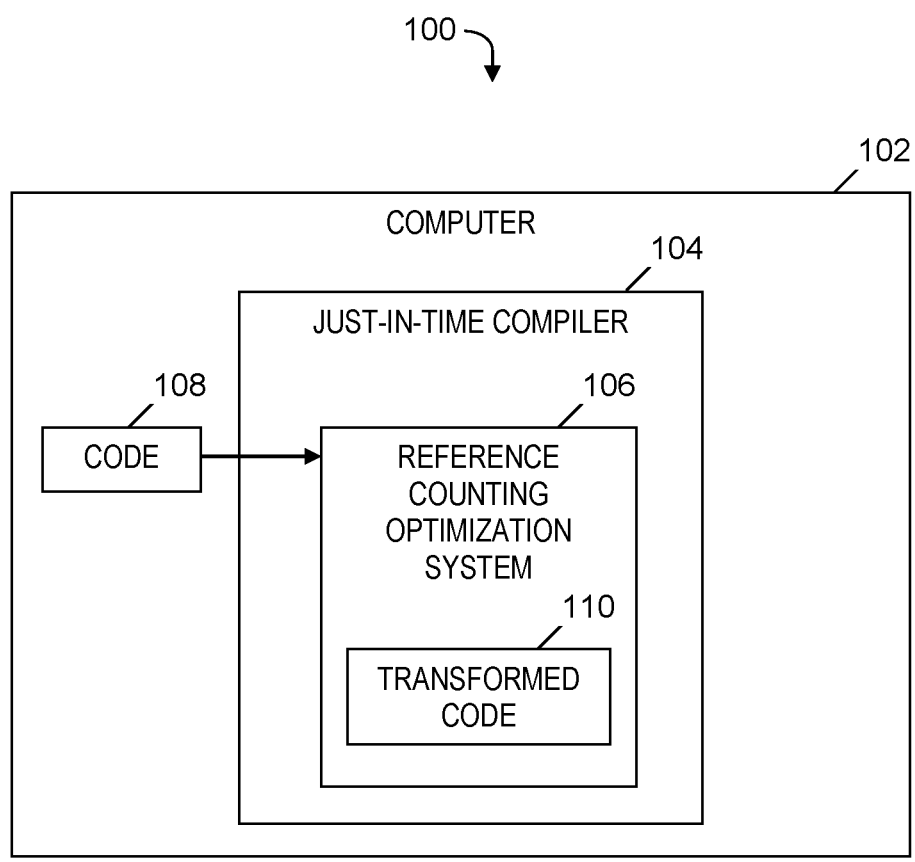
FIG. 1 is a block diagram of a system for optimizing reference counting, in accordance with embodiments of the present invention.

In a multi-processor environment, reference counting must be done atomically to avoid functional problems as well as memory leaks. An atomic reference counting operation consists of incrementing or decrementing an in-memory value in such a way that the increment or decrement becomes visible to all threads of execution simultaneously. If multiple threads tried to access the same resource and reference counting was not atomic, then an incorrect updated reference count value may be stored. For example, if two threads try to access the same resource simultaneously without atomic reference counting, then both threads load the current reference count of one, increase the reference count value from one to two, and then store the updated reference count value as two, which differs from atomic reference counting which would ensure that a first one of the two threads increases the reference count value from one to two and further ensure that a second one of the two threads increases the reference count value from two to three.

Atomic reference counting is more expensive than regular addition or subtraction on a variable in memory because it forces other threads to wait so those threads cannot do useful work during the wait. Furthermore, reference counting operations add throughput overhead because there are two reference counts that need to be adjusted each time a reference store is executed. That is, the reference count of the object currently pointed to by the memory location needs to have its reference count decremented and the reference count of the object it is updated to point to needs to have its reference count incremented. The instructions to perform atomic updates to memory are among the most expensive ones on most known architectures (e.g., the lock family of instructions). Still further, reference stores are expected to be common with certain known programming languages. Therefore, the overhead of reference counting is expected to be high in most programs. For example, running the Kitura web server written in the Swift® programming language shows approximately a 15% overhead in the reference counting logic. Swift is a registered trademark of Apple Inc. located in Cupertino, Calif. In smaller micro benchmarks, the overhead of reference counting can be much higher, thereby drowning out the time spent doing useful work that the user intended. The overhead may be excessively high even though a static compiler for the known programming language employs some basic optimizations to coalesce or eliminate reference counting operations wherever possible.

Embodiments of the present invention address the aforementioned challenges of reference counting by employing hardware transactional memory to optimize reference counting (i.e., reduce the throughput overhead of reference counting). Traditionally, hardware transactional memory has been employed in a JIT compiler for languages such as the Java® programming language to elide locks; i.e., execute a synchronized region in a transaction and then, if the transaction succeeds, the locking operations and the associated scaling bottleneck in case of contention can be avoided. Java is a registered trademark of Oracle America, Inc. located in Redwood Shores, Calif. The overhead of starting and ending a transaction is typically slightly higher than the atomic operations used to implement synchronization in the absence of thread contention. Thus, hardware transactional memory must be employed selectively in cases in which false contention is expected or there are multiple atomic operations in the code being enclosed within the transaction. Since a transaction makes all the side effects of the enclosed code visible atomically, the multiple atomic instructions within the enclosed code can be replaced by their non-atomic instruction variants that typically incur less overhead. Embodiments of the present invention realize the advantage of decreasing overhead by using transactional memory to coalesce multiple operations into a single operation so that the overall overhead of reference counting is reduced. In one embodiment, a JIT compiler identifies regions of code having multiple atomic reference counting operations, employs transactional memory to enclose each region in a corresponding transaction, transforms code in each region that performs the atomic operations to instead use non-atomic instructions, and falls back to execute the original code sequence having the multiple atomic operations if the transaction fails. Because reference counting operations are in code that is enclosed in a transaction, the reference counting operations appear to be performed atomically, but instead are performed non-atomically. In one embodiment, the JIT compiler employs the optimization of reference counting for a program in response to determining that transactional memory is supported by the computing machinery that is executing the program. Although some embodiments described herein include a JIT compiler, other embodiments of the present invention apply the optimization of reference counting to any type of compiler, including a static compiler which has knowledge that the hardware on which the compiled program will run supports hardware transactional memory.

System for Optimizing Reference Counting

FIG. 1 is a block diagram of a system 100 for optimizing reference counting, in accordance with embodiments of the present invention. System 100 includes a computer 102 which executes a JIT compiler 104, which includes a software-based reference counting optimization system 106.

Reference counting optimization system 106 determines that computing machinery included in computer 102 supports hardware transactional memory (e.g., processors, cache and bus protocol modified to support transactions). In one embodiment, reference counting optimization system 106 determines that computer 102 provides a computer architecture that supports hardware transactional memory. For example, computer 102 may provide a X86 or System Z computer architecture, which supports hardware transactional memory. System 100 uses features of transactional memory including the ability to (i) enclose arbitrary code inside a hardware transaction, (ii) make all side-effects of the enclosed code visible to other threads atomically, and (iii) provide a fallback code path that can be executed non-transactionally in response to a failure of a transaction. Hardware transactional memory is also referred to herein as transactional memory.

Reference counting optimization system 106 receives code 108 that performs reference counting. In one embodiment, code 108 executes in a multi-threaded, multi-processor environment. For example, code 108 is programming code written in the Swift® programming language.

Reference counting optimization system 106 identifies regions of code 108 that include multiple reference counting operations to be executed dynamically. Reference counting optimization system 106 employs hardware transactional memory to enclose the regions of code 108 in respective transactions. For a given identified region of code 108, reference counting optimization system 106 transforms the region of code into transformed code 110, so that all atomic operations in the region of code are changed to non-atomic instructions, which includes changing atomic reference counting operations to non-atomic reference counting operations. For a given identified region of code 108, reference counting optimization system 106 inserts into transformed code 110 a fallback code sequence so that the original code sequence that includes the multiple atomic reference counting operations is executed non-transactionally in response to a failure of the transaction that encloses the given identified region.

In other embodiments, system 100 includes a static compiler instead of JIT compiler 104, where the static compiler includes reference counting optimization system 106. In the case of system 100 including a static compiler, the functionality of reference counting optimization system 106 relative to the discussion of FIG. 1 and the discussion of FIG. 2 presented below is based on the static compiler determining or otherwise having knowledge that the hardware on which the compiled program will run supports hardware transactional memory.

Figure 2:
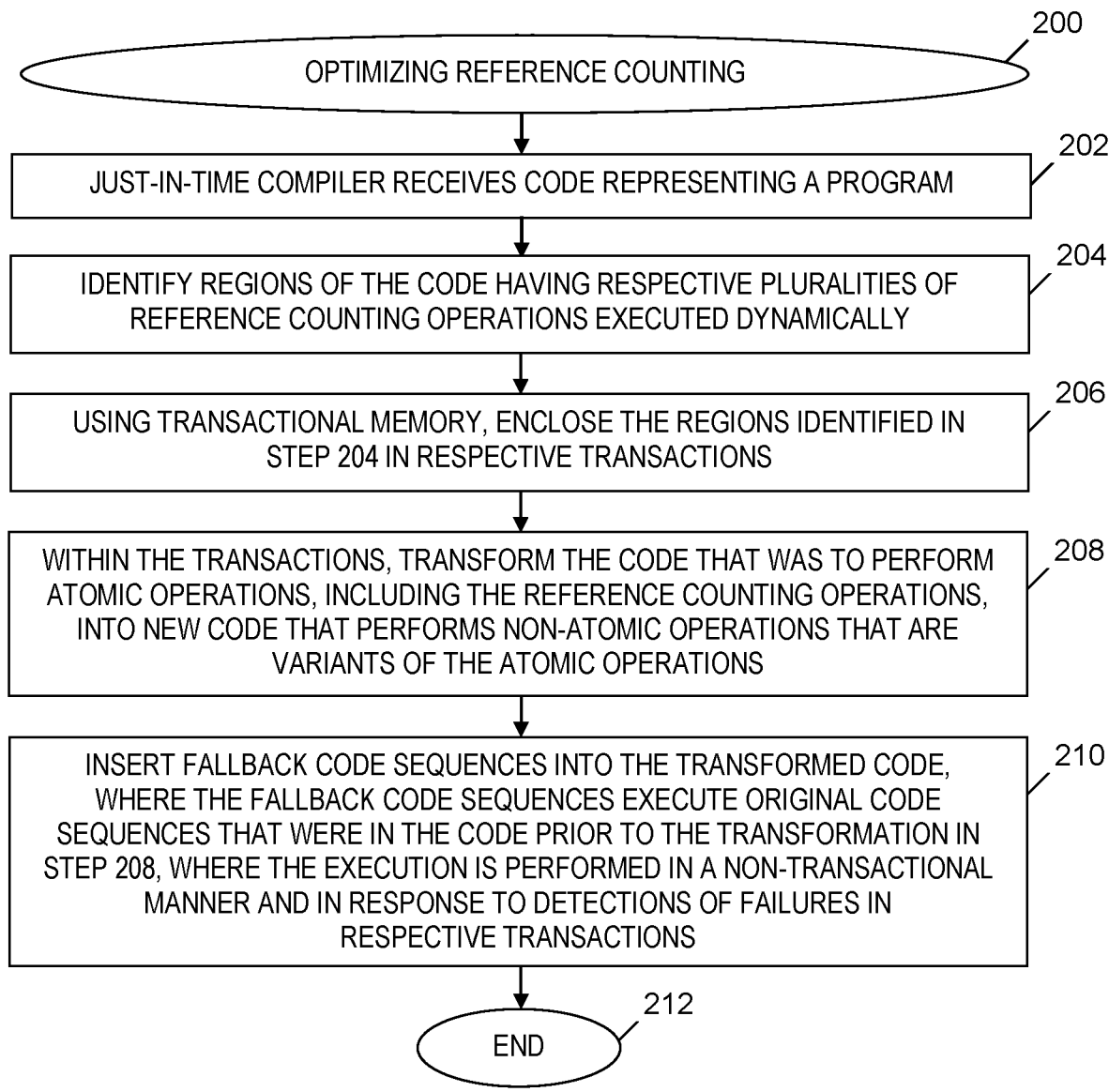
FIG. 2 is a flowchart of a process of optimizing reference counting, where the process is implemented in the system of FIG. 1, in accordance with embodiments of the present invention.
Figure 3:
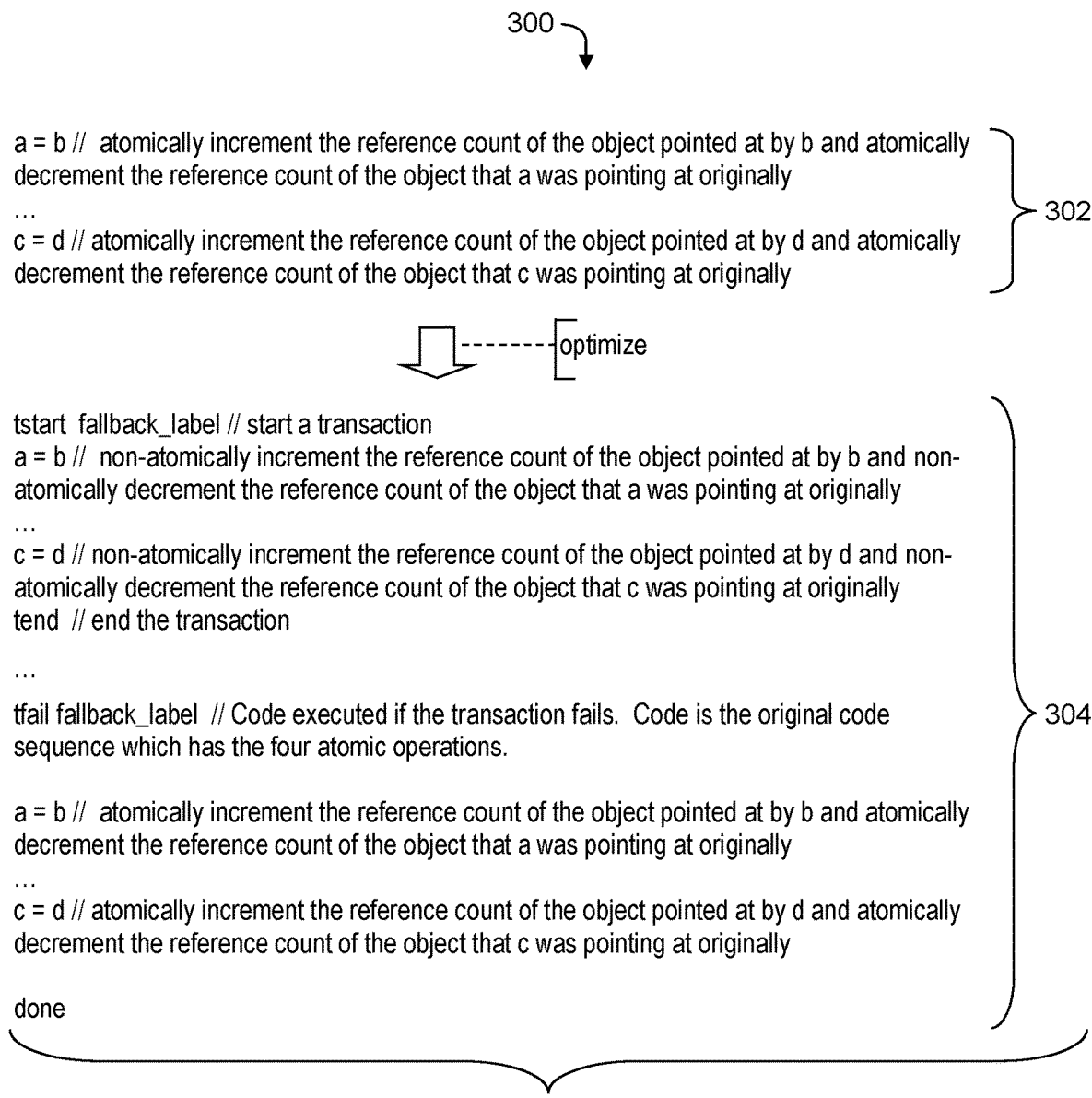
FIG. 3 is an example of an optimization of reference counting using the process of FIG. 2 in the system of FIG. 1, in accordance with embodiments of the present invention.

The functionality of the components shown in FIG. 1 is described in more detail in the discussion of FIG. 2 and FIG. 3 presented below.

Process for Optimizing Reference Counting

FIG. 2 is a flowchart of a process of optimizing reference counting, where the process is implemented in the system of FIG. 1, in accordance with embodiments of the present invention. The process of FIG. 2 starts at step 200. In step 202, reference counting optimization system 106 (see FIG. 1) receives code 108 (see FIG. 1) which represents a computer program.

In step 204, reference counting optimization system 106 (see FIG. 1) identifies regions of code 108 (see FIG. 1) having respective pluralities of reference counting operations executed dynamically. In one embodiment, a region identified in step 204 is less than or equal to a block of code (i.e., straight-line sequence of code) for which execution by a processor is guaranteed to start at the first instruction of the block and reach the last instruction of the block.

In step 206, reference counting optimization system 106 (see FIG. 1) encloses the regions identified in step 204 in respective transactions by employing transactional memory. The transactional memory is supported by computing machinery included in computer 102 (see FIG. 1). In one embodiment, step 206 includes, for a region being enclosed in a given transaction, reference counting optimization system 106 (see FIG. 1) inserting one instruction (i.e., transaction begin instruction) to begin the transaction and another instruction (i.e., transaction end instruction) to end the transaction. Reference counting optimization system 106 (see FIG. 1) inserts the transaction begin instruction before the code in the region and inserts the transaction end instruction after the code in the region.

In one embodiment, reference counting optimization system 106 (see FIG. 1) determines that intervening code between first and second reference counting operations in a region included in the regions identified in step 204 will not cause or is not likely to cause a transaction to fail for performance-related reasons (e.g., no specific instructions that abort a transaction). To determine whether intervening code presents a performance risk, reference counting optimization system 106 (see FIG. 1) performs a cost benefit analysis that considers the number of transaction start and end instructions added, the number of atomic reference count updates eliminated, and the risk of the transaction(s) failing. Step 206 includes reference counting optimization system 106 (see FIG. 1) enclosing the region in the transaction in response to the intervening code being determined to not cause or be not likely to cause the transaction to fail.

In step 208, within each of the transactions into which the regions were enclosed in step 206, reference counting optimization system 106 (see FIG. 1) transforms the code that was to perform atomic operations, including the plurality of reference counting operations, into new code (i.e., transformed code 110 in FIG. 1) that performs non-atomic operations that are variants of the atomic operations. Transformed code 110 (see FIG. 1) also includes the transaction begin and transaction end instructions inserted in step 206.

In step 210, reference counting optimization system 106 (see FIG. 1) inserts fallback code sequences into the code transformed in step 208 for respective transactions. The fallback code sequences execute original code sequences that were in the code prior to the transformation in step 208. The execution of the original code sequences in the fallback code sequences are performed in a non-transactional manner (i.e., without employing the transactional memory) and in response to reference counting optimization system 106 (see FIG. 1) detecting failures in the respective transactions. In one embodiment, a processor executes a fallback code sequence in response to the processor detecting a failure of a transaction and determining that the failure is a persistent failure (i.e., a failure that cannot be overcome by retrying the transaction one or more times). In one embodiment, transformed code 110 (see FIG. 1) also includes the fallback code sequences inserted in step 210.

After step 210, the process of FIG. 2 ends at step 212.

In one embodiment, JIT compiler 104 (see FIG. 1) determines that the computing machinery included in computer 102 (see FIG. 1) supports transactional memory and steps 204, 206, 208, and 210 are performed in response to the determination that the computing machinery supports the transactional memory. For example, JIT compiler 104 (see FIG. 1) receives the capabilities (including the transactional memory capabilities) of the computing machinery from the operating system or from a processor that calls an instruction (e.g., CPUID instruction) that returns details of the capabilities of the processor.

In one embodiment, JIT compiler 104 (see FIG. 1) is a JIT compiler for the Swift® programming language and can check whether the computing machinery supports transactional memory before a method is compiled by JIT compiler 104 (see FIG. 1) and before the optimization in the process of FIG. 2 is performed. In many cases, the static compiler for the Swift® programming language needs to support different generations of hardware and since the transactional memory is a new enough feature that for the near future, there will be uncertainty regarding whether a customer's computing machines will have the transactional memory facility or not. In these cases of uncertainty, the static Swift® compiler cannot use transactional memory since it must generate code for the lowest common denominator in terms of the generations of hardware it has to support. The presence of JIT compiler 104 (see FIG. 1) allows for its compilations to be aware of the specific generation of hardware on which JIT compiler 104 (see FIG. 1) is running and the code sequences generated by the reference counting optimization can exploit all the features of that particular generation of hardware. The JIT compiler 104 (see FIG. 1) provides other advantages such as being able to transparently perform profile directed feedback, which further assists the optimizations of reference counting described herein (e.g., reference counting optimization system 106 (see FIG. 1) uses in-lining to expose more reference counting operations that can be optimized by the process of FIG. 2).

In one embodiment, one or more processors included in computer 102 (see FIG. 1) or in another computer execute the non-atomic operations included in the code transformed in step 208 instead of atomic operations, thereby reducing processing overhead compared to an execution of the atomic operations included in code 108 (see FIG. 1) received in step 202.

In one embodiment, based on the computing machinery included in computer 102 (see FIG. 1) supporting the transactional memory, reference counting optimization system 106 (see FIG. 1) makes side effects of the regions enclosed in step 206 visible to threads atomically and step 208 is based on the side effects of the enclosed identified regions being made visible to the threads atomically.

In one embodiment, reference counting optimization system 106 (see FIG. 1) determines that N reference counting operations is a least number of reference counting operations by which an overhead of processing the reference counting operations as N non-atomic operations in a single transaction generated by steps 206 and 208 is less than an overhead in processing the N reference counting operations atomically, where N is an integer greater than one. In the embodiment described in this paragraph, step 204 includes reference counting optimization system 106 (see FIG. 1) identifying a given region of code 108 (see FIG. 1) so that a plurality of reference counting operations in the given region includes at least N reference counting operations.

In one embodiment, reference counting optimization system 106 (see FIG. 1) determines that an execution of other regions of code 108 (see FIG. 1) will result in a false contention of threads. Based on the determination that the execution of the other regions of code will result in the false contention, reference counting optimization system 106 (see FIG. 1) (i) encloses the other regions in respective other transactions; (ii) transforms the other regions of code into other new code that performs other non-atomic operations that are variants of other atomic operations that were to be performed by the other regions of code 108 (see FIG. 1) prior to step (ii) (i.e., the step of transforming the other regions of the code); and (iii) in a non-transactional manner and in response to detections of failures in the other transactions, inserts other fallback code sequences that execute other original code sequences that were in the code prior to step (ii), including respective multiple atomic operations.

EXAMPLE

FIG. 3 is an example 300 of an optimization of reference counting using the process of FIG. 2 in the system of FIG. 1, in accordance with embodiments of the present invention. Prior to using transactional memory to reduce overhead reference counting, code 108 (see FIG. 1) includes code 302, which includes the instructions a=b and c=d. The a=b instruction in code 302 atomically increments the reference count of the object pointed at by b and atomically decrements the reference count of the object that a was pointing at originally. The c=d instruction in code 302 atomically increments the reference count of the object pointed at by d and atomically decrements the reference count of the object that c was pointing at originally. Using conventional techniques, the stores resulting from a=b and c=d would require four different atomic updates if the compiler did not know anything about the objects involved (which is common). In an embodiment of the present invention, reference counting optimization system 106 (see FIG. 1) optimizes the instructions by generating code 304 which includes the result of enclosing code 302 in a transaction and transforming the enclosed code into non-atomic instructions. Code 304 includes a=b and c=d. The a=b instruction in code 304 non-atomically increments the reference count of the object pointed at by b and non-atomically decrements the reference count of the object that a was pointing at originally. The c=d instruction in code 304 non-atomically increments the reference count of the object pointed at by d and non-atomically decrements the reference count of the object that c was pointing at originally.

Code 304 also includes code following the tfail label, which is the same as code 302 (i.e., the original code sequence that has the four atomic operations) and which is executed if the transaction in code 304 fails for any reason. The a=b instruction that follows the tfail label in code 304 atomically increments the reference count of the object pointed at by b and atomically decrements the reference count of the object that a was pointing at originally. The c=d instruction that follows the tfail label in code 304 atomically increments the reference count of the object pointed at by d and atomically decrements the reference count of the object that c was pointing at originally.

The code inside the transaction in code 304 does not do any atomic operations and provided the transaction succeeds, the performance in the case of the transaction is expected to be better than executing the original code sequence because the performance cost of starting and ending the one transaction is expected to be lower than the cost of executing four atomic operations.

Computer System

Figure 4:
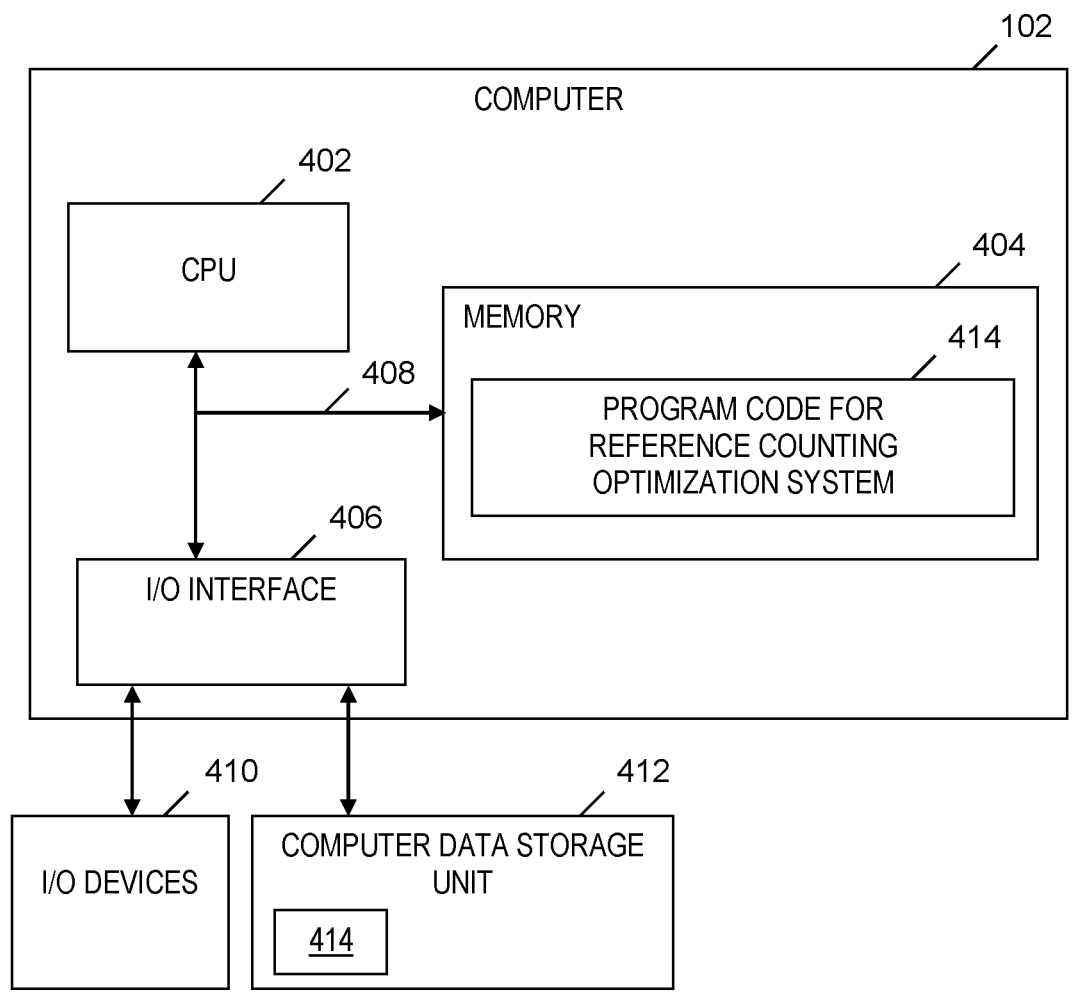
FIG. 4 is a block diagram of a computer included in the system of FIG. 1 and that implements the process of FIG. 2, in accordance with embodiments of the present invention.

FIG. 4 is a block diagram of a computer included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for reference counting optimization system 106 (see FIG. 1) to perform a method of optimizing reference counting, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to optimize reference counting. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimizing reference counting. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to optimize reference counting. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing reference counting.

While it is understood that program code 414 for optimizing reference counting may be deployed by manually loading directly in client, server and proxy computers (not shown) via loading a computer readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing reference counting. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of optimizing reference counting, the method comprising the steps of:
 in response to receiving code representing a program by a just-in-time (JIT) compiler, identifying, by one or more processors in computing machinery supporting transactional memory, regions of the code having respective pluralities of reference counting operations executed dynamically, the step of identifying using an analysis of semantics of the code;
 enclosing, by the one or more processors and using the transactional memory, the identified regions in respective transactions;
 transforming, by the one or more processors and within the transactions, the code that was to perform atomic operations, including the reference counting operations in the identified regions, into new code that performs non-atomic operations that are variants of the atomic operations; and
 inserting, by the one or more processors and into the transformed code, fallback code sequences that execute, in a non-transactional manner and in response to detections of failures in respective transactions, original code sequences that were in the code prior to the step of transforming, including respective multiple atomic operations.

2. The method of claim 1, further comprising the step of executing, by the one or more processors, the non-atomic operations included in the transformed code instead of the atomic operations to reduce processing overhead compared to an execution of the atomic operations included in the original code sequences.

3. The method of claim 1, further comprising the step of determining, by the one or more processors, that a region that includes at least two reference counting operations and is included in the regions of the code is not likely to cause a transaction to fail, wherein the step of enclosing includes enclosing the region in the transaction in response to the region being determined to be not likely to cause the transaction to fail.

4. The method of claim 1, further comprising the steps of:
 determining, by the one or more processors, that an execution of other regions of the code results in a false contention of threads; and
 based on the execution of the other regions of the code resulting in the false contention, the one or more other processors (i) enclosing the other regions in respective other transactions, (ii) transforming the other regions of the code into other new code that performs other non-atomic operations that are variants of other atomic operations that were to be performed by the other regions of the code prior to the step of transforming the other regions of the code, and (iii) inserting other fallback code sequences that execute, in a non-transactional manner and in response to detections of failures in the other transactions, other original code sequences that were in the code prior to the step of transforming, including respective other multiple atomic operations.

5. The method of claim 1, further comprising the step of determining, by the JIT compiler, that the computing machinery supports the transactional memory, wherein the steps of identifying the regions of the code, enclosing the identified regions in the respective transactions, transforming the code into the new code that performs the non-atomic operations, and inserting the fallback code sequences are performed in response to the step of determining that the computing machinery supports the transactional memory.

6. The method of claim 1, further comprising the step of based on the transactional memory being supported by the computing machinery, the one or more processors making side effects of the enclosed identified regions visible to threads atomically, wherein the step of transforming the code into the new code that performs the non-atomic operations is based on the side effects of the enclosed identified regions being made visible to the threads atomically.

7. The method of claim 1, further comprising the step of determining, by the one or more processors, that N reference counting operations is a least number of reference counting operations by which an overhead of processing the N reference counting operations as N non-atomic operations in a single transaction is less than an overhead in processing the N reference counting operations atomically, wherein N is an integer greater than one, and
wherein the step of identifying the regions of the code includes identifying a given region of the code so that a plurality of reference counting operations in the given region includes at least N reference counting operations.

8. The method of claim 1, further comprising the step of:
providing at least one support service for at least one of creating, integrating, hosting, maintaining, and deploying computer readable program code in the computer, the program code being executed by a processor of the computer to implement the steps of identifying the regions of the code, enclosing the identified regions in the respective transactions, transforming the code into the new code that performs the non-atomic operations, and inserting the fallback code sequences.

9. A computer program product for optimizing reference counting, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:
in response to receiving code representing a program by a just-in-time (JIT) compiler, the computer system identifying regions of the code having respective pluralities of reference counting operations executed dynamically, the step of identifying using an analysis of semantics of the code, and the computer system being included in computing machinery that supports transactional memory;
the computer system enclosing the identified regions in respective transactions by using the transactional memory;
the computer system transforming the code within the transactions that was to perform atomic operations, including the reference counting operations in the identified regions, into new code that performs non-atomic operations that are variants of the atomic operations; and
the computer system inserting into the transformed code fallback code sequences that execute, in a non-transactional manner and in response to detections of failures in respective transactions, original code sequences that were in the code prior to the step of transforming, including respective multiple atomic operations.

10. The computer program product of claim 9, wherein the method further comprises the step of the computer system executing the non-atomic operations included in the transformed code instead of the atomic operations to reduce processing overhead compared to an execution of the atomic operations included in the original code sequences.

11. The computer program product of claim 10, wherein the method further comprises the step of the computer system determining that a region that includes at least two reference counting operations and included in the regions of the code is not likely to cause a transaction to fail, wherein the step of enclosing includes enclosing the region in the transaction in response to the region being determined to be not likely to cause the transaction to fail.

12. The computer program product of claim 9, wherein the method further comprises the steps of:
the computer system determining that an execution of other regions of the code results in a false contention of threads; and
based on the execution of the other regions of the code resulting in the false contention, the computer system (i) enclosing the other regions in respective other transactions, (ii) transforming the other regions of the code into other new code that performs other non-atomic operations that are variants of other atomic operations that were to be performed by the other regions of the code prior to the step of transforming the other regions of the code, and (iii) inserting other fallback code sequences that execute, in a non-transactional manner and in response to detections of failures in the other transactions, other original code sequences that were in the code prior to the step of transforming, including respective other multiple atomic operations.

13. The computer program product of claim 9, wherein the method further comprises the step of the computer system determining, by the JIT compiler, that the computing machinery supports the transactional memory, wherein the steps of identifying the regions of the code, enclosing the identified regions in the respective transactions, transforming the code into the new code that performs the non-atomic operations, and inserting the fallback code sequences are performed in response to the step of determining that the computing machinery supports the transactional memory.

14. The computer program product of claim 9, wherein the method further comprises the step of based on the transactional memory being supported by the computing machinery, the computer system making side effects of the enclosed identified regions visible to threads atomically, wherein the step of transforming the code into the new code that performs the non-atomic operations is based on the side effects of the enclosed identified regions being made visible to the threads atomically.

15. A computer system comprising:
a central processing unit (CPU);
a memory coupled to the CPU; and
a computer readable storage medium coupled to the CPU, the computer readable storage medium containing instructions that are executed by the CPU via the memory to implement a method of optimizing reference counting, the method comprising the steps of:
in response to receiving code representing a program by a just-in-time (JIT) compiler, the computer system identifying regions of the code having respective pluralities of reference counting operations executed dynamically, the step of identifying using an analysis of semantics of the code, and the computer system being included in computing machinery that supports transactional memory;
the computer system enclosing the identified regions in respective transactions by using the transactional memory;
the computer system transforming the code within the transactions that was to perform atomic operations, including the reference counting operations in the identified regions, into new code that performs non-atomic operations that are variants of the atomic operations; and
the computer system inserting into the transformed code fallback code sequences that execute, in a non-transactional manner and in response to detections of failures in respective transactions, original code sequences that were in the code prior to the step of transforming, including respective multiple atomic operations.

16. The computer system of claim 15, wherein the method further comprises the step of the computer system executing the non-atomic operations included in the transformed code instead of the atomic operations to reduce processing overhead compared to an execution of the atomic operations included in the original code sequences.

17. The computer system of claim 15, wherein the method further comprises the step of the computer system determining that a region that includes at least two reference counting operations and is included in the regions of the code is not likely to cause a transaction to fail, wherein the step of enclosing includes enclosing the region in the transaction in response to the region being determined to be not likely to cause the transaction to fail.

18. The computer system of claim 15, wherein the method further comprises the steps of:
the computer system determining that an execution of other regions of the code results in a false contention of threads; and
based on the execution of the other regions of the code resulting in the false contention, the computer system (i) enclosing the other regions in respective other transactions, (ii) transforming the other regions of the code into other new code that performs other non-atomic operations that are variants of other atomic operations that were to be performed by the other regions of the code prior to the step of transforming the other regions of the code, and (iii) inserting other fallback code sequences that execute, in a non-transactional manner and in response to detections of failures in the other transactions, other original code sequences that were in the code prior to the step of transforming, including respective other multiple atomic operations.

19. The computer system of claim 15, wherein the method further comprises the step of the computer system determining, by the JIT compiler, that the computing machinery supports the transactional memory, wherein the steps of identifying the regions of the code, enclosing the identified regions in the respective transactions, transforming the code into the new code that performs the non-atomic operations, and inserting the fallback code sequences are performed in response to the step of determining that the computing machinery supports the transactional memory.

20. The computer system of claim 15, wherein the method further comprises the step of based on the transactional memory being supported by the computing machinery, the computer system making side effects of the enclosed identified regions visible to threads atomically, wherein the step of transforming the code into the new code that performs the non-atomic operations is based on the side effects of the enclosed identified regions being made visible to the threads atomically.

* * * * *